United States Patent
Yoshino

(10) Patent No.: US 12,113,578 B2
(45) Date of Patent: Oct. 8, 2024

(54) OPTICAL SENDER AND METHOD FOR DECIDING MODULATION TIMING CORRECTNESS

(71) Applicant: NEC Corporation, Tokyo (JP)

(72) Inventor: Ken-ichiro Yoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 130 days.

(21) Appl. No.: 18/009,145

(22) PCT Filed: Jun. 10, 2020

(86) PCT No.: PCT/JP2020/022912
§ 371 (c)(1),
(2) Date: Dec. 8, 2022

(87) PCT Pub. No.: WO2021/250829
PCT Pub. Date: Dec. 16, 2021

(65) Prior Publication Data
US 2023/0254045 A1    Aug. 10, 2023

(51) Int. Cl.
*H04B 10/524* (2013.01)
*H04B 10/54* (2013.01)
(Continued)

(52) U.S. Cl.
CPC ........... *H04B 10/524* (2013.01); *H04B 10/54* (2013.01); *H04B 17/201* (2023.05); *H04B 10/70* (2013.01)

(58) Field of Classification Search
None
See application file for complete search history.

(56) References Cited

U.S. PATENT DOCUMENTS

| 7,907,850 B2 * | 3/2011 | Tanaka | H04L 9/0858 380/278 |
| 8,041,232 B2 * | 10/2011 | Tanaka | H04B 10/548 398/201 |

(Continued)

FOREIGN PATENT DOCUMENTS

| JP | 2010-028528 A | 2/2010 |
| JP | 2015-018109 A | 1/2015 |

(Continued)

OTHER PUBLICATIONS

International Search Report for PCT Application No. PCT/JP2020/022912, mailed on Sep. 15, 2020.

*Primary Examiner* — Jai M Lee
(74) *Attorney, Agent, or Firm* — Sughrue Mion, PLLC

(57) ABSTRACT

An optical sender is disclosed, which alone makes it possible to reliably decide whether modulation timing is correct or incorrect and to adjust the modulation timing. The optical sender includes: a first modulator that outputs a first optical pulse train subjected to intensity modulation; an asymmetric interferometer that outputs a second optical pulse train of double pulses; a second modulator (104) that outputs a third optical pulse train subjected to send-data modulation for each pulse pair; nd an optical intensity measuring device that measures an optical intensity of the third optical pulse train, a controller, when changing either of a first optical pulse train according to intensity modulation pattern and a second optical pulse train according to send-data modulation pattern, decides whether the modulation timing is correct or incorrect, based on optical intensity of the third optical pulse train.

16 Claims, 12 Drawing Sheets

(51) Int. Cl.
     *H04B 10/70*           (2013.01)
     *H04B 17/20*           (2015.01)

(56) References Cited

U.S. PATENT DOCUMENTS

| | | | |
|---|---|---|---|
| 8,121,489 B2* | 2/2012 | Tomaru | H04B 10/5561 |
| | | | 398/141 |
| 8,718,485 B2* | 5/2014 | Tanaka | H04L 9/0858 |
| | | | 398/185 |
| 9,876,580 B2* | 1/2018 | Yuan | H04B 10/70 |
| 11,271,661 B2* | 3/2022 | Yoshino | H04B 10/70 |
| 11,309,970 B2* | 4/2022 | Woodward | H04B 10/70 |
| 11,362,817 B2* | 6/2022 | Tomita | G02F 1/035 |
| 11,387,992 B2* | 7/2022 | Kikawada | H04L 9/0858 |
| 2007/0248362 A1* | 10/2007 | Tanaka | H04B 10/70 |
| | | | 398/189 |
| 2008/0165900 A1* | 7/2008 | Vassilieva | H04L 27/06 |
| | | | 375/329 |

FOREIGN PATENT DOCUMENTS

| | | |
|---|---|---|
| JP | 2016-001868 A | 1/2016 |
| WO | 2018/047716 A1 | 3/2018 |

\* cited by examiner

EXEMPLARY EMBODIMENT

OPTICAL SENDER AND METHOD FOR DECIDING MODULATION TIMING CORRECTNESS

This application is a National Stage Entry of PCT/JP2020/022912 filed on Jun. 10, 2020, the contents of all of which are incorporated herein by reference, in their entirety.

TECHNICAL FIELD

The present invention relates to a method for deciding whether modulation timing of double pulses optically modulated is correct or incorrect, and an optical sender employing the method.

BACKGROUND ART

In the field of optical communications, quantum key distribution (QKD) is expected to realize high security of a transmission line and its research and development for practical use has been actively underway. Hereafter, taking a sender (Alice) of QKD system as an example, the phase-time coding of an optical double pulse will be described with reference to FIG. 1. Such a sender is a common one described in Patent Literature 1 and the like.

In FIG. 1, a laser light source outputs optical pulses with a constant period T, and through an asymmetric interferometer, each optical pulse P is separated into two consecutive pulses P1 and P2 (a double pulse) having a predetermined time difference $\Delta T$. The double pulse is encoded according to the phase-time coding scheme by phase or intensity modulation, thereby randomly generating four states consisting of two states Y0 and Y1 in phase basis (Y basis) and two states Z0 and Z1 in time basis. A double pulse thus set to any one of the four states is attenuated to a single-photon level. The attenuated double pulse is sent to a receiver (Bob) through an optical transmission line.

However, an optical pulse that has been attenuated and sent in this manner is not always a true single-photon pulse, but may actually contain multiple photons. Such a pseudo single-photon pulse can be exploited in an eavesdropping attack called a photon number splitting attack (PNS attack). To avoid the PNS attack, a decoy state method has been developed, which is capable of detecting the presence or absence of a PNS attack by changing the intensity of optical pulses appropriately. The decoy scheme is considered to be indispensable for QKD systems (see Patent Literature 2).

PRIOR ART LITERATURES

Patent Literatures

[Patent Literature 1] JP Publication No. 2010-028528
[Patent Literature 2] JP Publication No. 2015-018109.

SUMMARY OF INVENTION

Problems to be Solved by Invention

With the growing speed of QKD systems, the period T of an optical pulse train output from the laser light source becomes shorter. In consideration of the time difference $\Delta T$ between two consecutive pulses of a double pulse, the setting satisfying $\Delta T = T/2$ has the highest efficiency. However, when $\Delta T = T/2$, consecutive pulses of double pulses are spaced at equal intervals. Accordingly, it is impossible to distinguish whether or not a pair of two adjacent pulses is a double pulse generated by branching a single original pulse P (hereafter, referred to as a correct pulse pair). As shown in FIG. 2, the error rate at the receiver is different between when modulation is performed on a correct pulse pair and when modulation is performed on an incorrect pulse pair. Accordingly, it can be determined that the modulation timing with the lowest error rate indicates the modulation on the correct pulse pair.

According to the method as shown in FIG. 2, however, both the receiver and the sender have to be used as a set and therefore the modulation timing cannot be adjusted by the sender alone. In addition, since the error rate at the receiver can change due to various factors other than modulation timing, a high error rate does not necessarily mean that the modulation timing is inadequate, which makes such a determination method uncertain.

Therefore, an object of the present invention is to provide a method of deciding whether modulation timing is correct or incorrect, and an optical sender employing the method, allowing the sender alone to reliably decide whether the modulation timing is correct or incorrect and to adjust the modulation timing.

Solution to Problem

An optical sender according to a first aspect of the present invention is an optical sender that modulates an optical pulse train having a predetermined period for data sending, includes: a first modulator that performs intensity modulation on the optical pulse train to output a first optical pulse train, wherein the intensity modulation is performed at least between a reference intensity and a zero intensity; an asymmetric interferometer that inputs the first optical pulse train and outputs a second optical pulse train of double pulses, wherein each double pulse is generated by temporally separating each optical pulse of the first optical pulse train; a second modulator that performs send-data modulation for each pulse pair of the second optical pulse train to output a third optical pulse train; an optical intensity measuring device that measures an optical intensity of the third optical pulse train; and a controller that controls the intensity modulation of the first modulator and the send-data modulation of the second modulator, wherein the controller is configured to: generate each double pulse of the second optical pulse train having the reference intensity or the zero intensity depending on the intensity modulation of the first optical pulse train according to an intensity modulation pattern; generate each pulse pair of the second optical pulse train with either pulse of the pulse pair having the zero intensity depending on the send-data modulation according to a send-data modulation pattern; and decide whether or not the pulse pair is the double pulse, based on an optical intensity of the third optical pulse train when changing either of the intensity modulation pattern and the send-data modulation pattern.

A modulation timing correctness deciding method according to a second aspect of the present invention is a modulation timing correctness deciding method in an optical sender that modulates an optical pulse train having a predetermined period for data sending, the method includes: by a first modulator, performing intensity modulation on the optical pulse train to output a first optical pulse train, wherein the intensity modulation is performed at least between a reference intensity and a zero intensity; by an asymmetric interferometer, inputting the first optical pulse train and outputting a second optical pulse train of double pulses, wherein each double pulse is generated by temporally separating each optical pulse of the first optical pulse train; by a second modulator, performing send-data modulation for each pulse pair of the second optical pulse train to output a third optical pulse train; by an optical intensity measuring device, measuring an optical intensity of the third optical pulse train; and by a controller, controlling the intensity modulation of the first modulator and the send-data modulation of the second modulator, thereby: generating each double pulse of the second optical pulse train having the reference intensity or the zero intensity depending on the intensity modulation of the first optical pulse train according to an intensity modulation pattern; generating each pulse pair of the second optical pulse train with either pulse of the pulse pair having the zero intensity depending on the send-data modulation according to a send-data modulation pattern; and deciding whether or not the pulse pair is the double pulse, based on an optical intensity of the third optical pulse train when changing either of the intensity modulation pattern and the send-data modulation pattern.

A program according to a third aspect of the present invention is a program for functioning a computer as a controller of an optical sender including: a first modulator that performs intensity modulation on the optical pulse train to output a first optical pulse train, wherein the intensity modulation is performed at least between a reference intensity and a zero intensity; an asymmetric interferometer that inputs the first optical pulse train and outputs a second optical pulse train of double pulses, wherein each double pulse is generated by temporally separating each optical pulse of the first optical pulse train; a second modulator that performs send-data modulation for each pulse pair of the second optical pulse train to output a third optical pulse train; and an optical intensity measuring device that measures an optical intensity of the third optical pulse train, the program functioning the computer, includes functions of: generating each double pulse of the second optical pulse train having the reference intensity or the zero intensity depending on the intensity modulation of the first optical pulse train according to an intensity modulation pattern; generating each pulse pair of the second optical pulse train with either pulse of the pulse pair having the zero intensity depending on the send-data modulation according to a send-data modulation pattern; and deciding whether or not the pulse pair is the double pulse, based on an optical intensity of the third optical pulse train when changing either of the intensity modulation pattern and the send-data modulation pattern.

Advantages of Invention

As described above, the present invention makes it possible to reliably decide whether the modulation timing is correct or incorrect, and to adjust the modulation timing by the sender alone.

EXEMPLARY EMBODIMENTS OF INVENTION

Outline of Exemplary Embodiment

An output optical pulse train of an asymmetric interferometer may be composed of double pulses, but it is impossible to decide which pulse pair is a double pulse (correct pulse pair). According to an exemplary embodiment of the present invention, intensity modulation on the input side of the asymmetric interferometer and send-data modulation on the output side of the asymmetric interferometer are each set to specific patterns. By changing either of these patterns and measuring the optical intensity of the optical pulse train subjected to the send-data modulation, it is possible to decide whether the modulation timing is correct or incorrect.

More specifically, the input optical pulse train of the asymmetric interferometer are modulated by intensity according to a first pattern, and the output optical pulse train of the asymmetric interferometer are modulated by send data such that either of two pulses of a pulse pair has zero intensity according to a second pattern. Either the first pattern or the second pattern is changed, resulting in changed optical intensity of the optical pulse train modulated by send data. The change in the optical intensity is monitored. Simply by detecting that the optical intensity changes or does not change, it is possible to decide whether the send-data modulation has been performed on the correct pulse pair, in other words, whether the modulation timing is correct or incorrect.

In the case where a decoy optical sender employs the phase-time basis coding scheme, the correctness or incorrectness of modulation timing can be decided only by measuring the optical intensity in the sender under the decoy intensity modulation and the time basis that are set in predetermined patterns. Since the correctness or incorrectness of the modulation timing can be decided by the sender alone, other variability factors can be eliminated, allowing reliable modulation timing adjustment.

Hereafter, taking a one-way interferometer system as an example, exemplary embodiments and examples of the present invention will be described in detail with reference to the drawings.

Exemplary Embodiment

Figure 3:
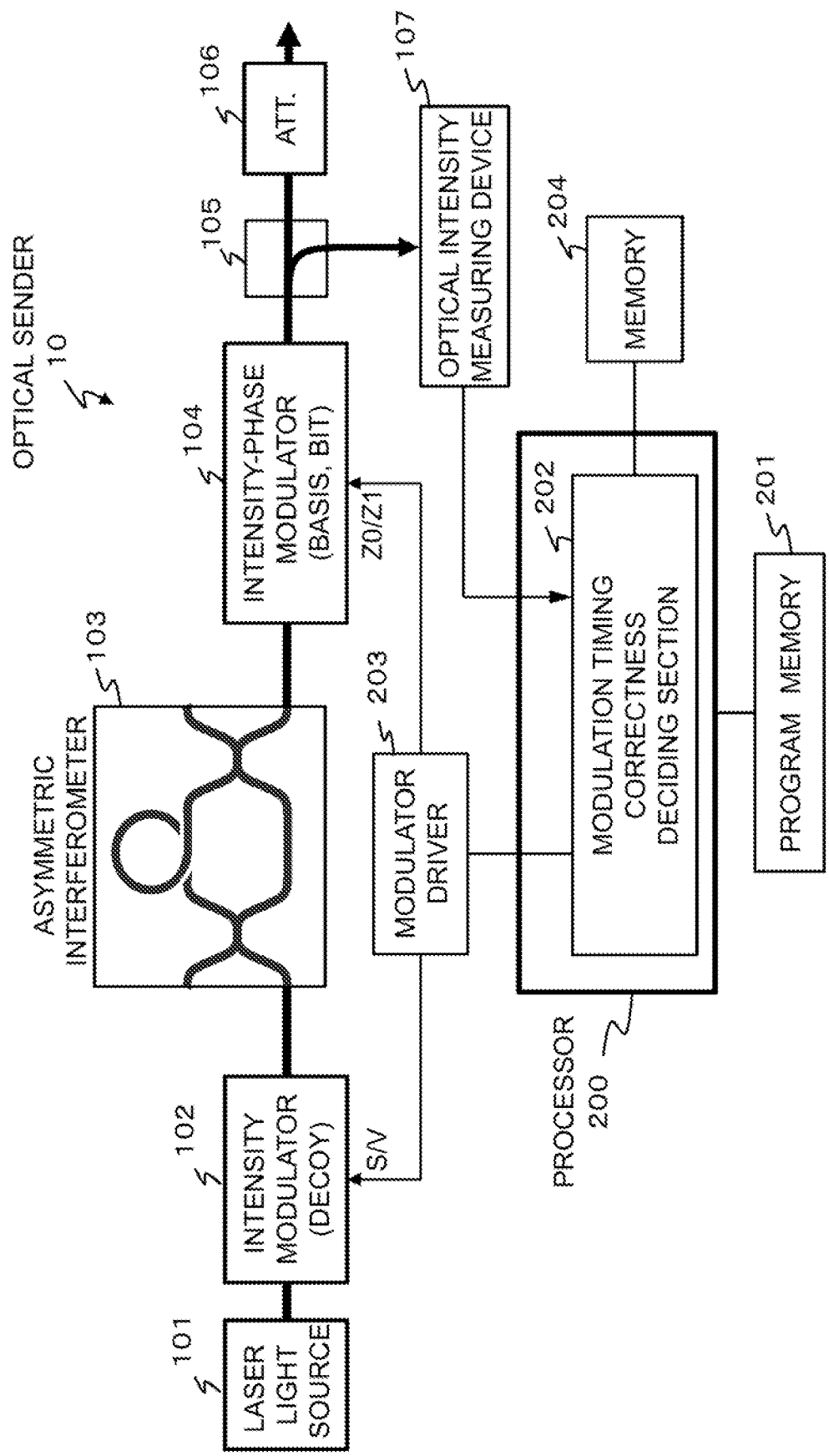
FIG. 3 is a block diagram illustrating a schematic configuration of an optical sender according to an exemplary embodiment of the present invention.

In FIG. 3, an optical sender 10 includes a laser light source 101, an intensity modulator 102, an asymmetric interferometer 103, intensity-phase modulator 104, an optical splitter 105 and an attenuator 106. Although the intensity modulator 102 is used for decoy states and the intensity-phase modulator 104 is used for phase-time basis coding, the present exemplary embodiment uses the intensity modulator 102 and the intensity-phase modulator 104 for deciding whether modulation timing is correct or incorrect as described below.

The asymmetric interferometer 103 includes two optical waveguides with different optical path lengths, thereby generating a double pulse consisting of two separate pulses with a predetermined delay time $\Delta t = T/2$ from each of optical pulses having a period of T (e.g. 800 ps) output by the laser light source 101.

Figure 1:
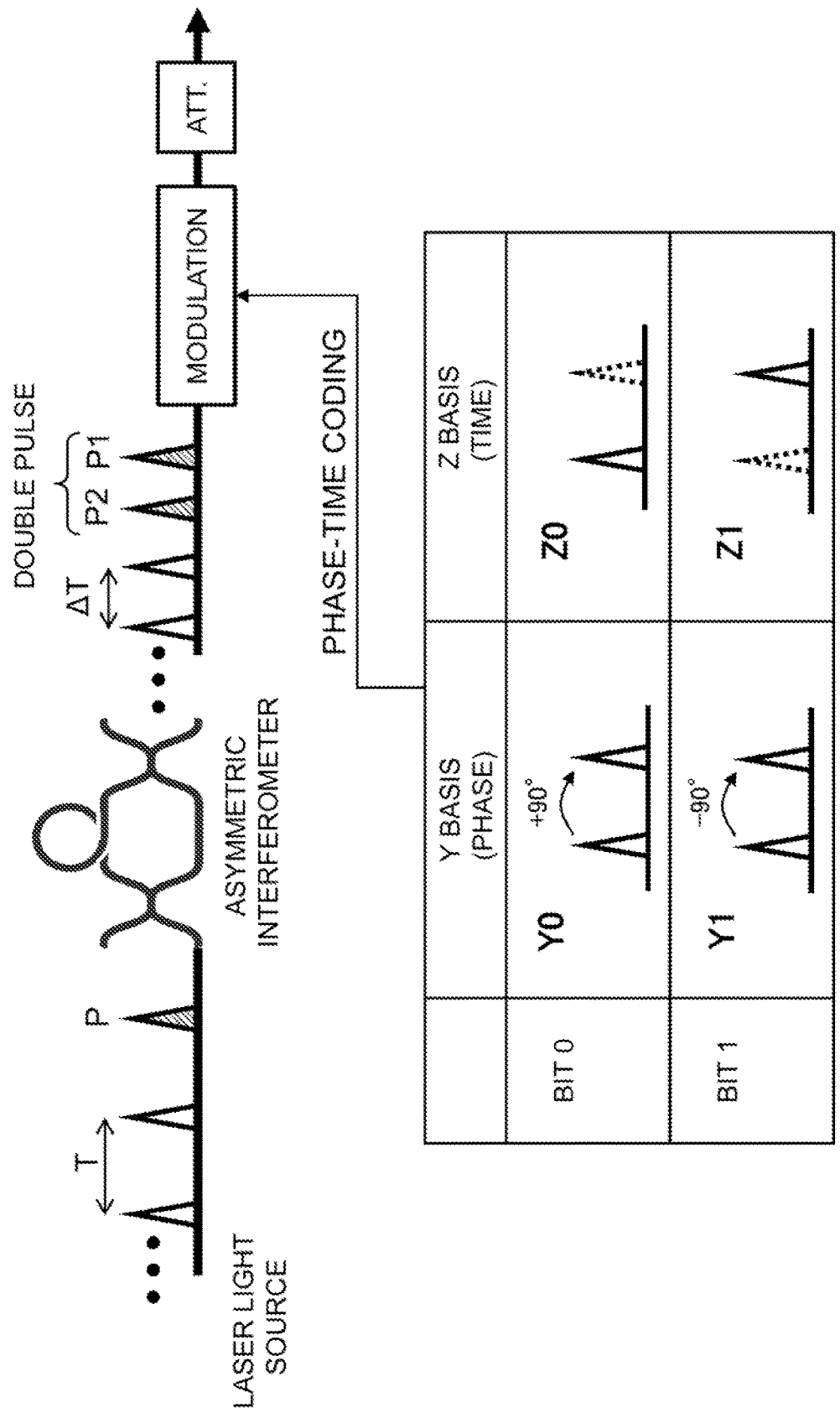
FIG. 1 is a schematic diagram showing an example of a sender in a quantum key distribution system as a background art.
Figure 2:
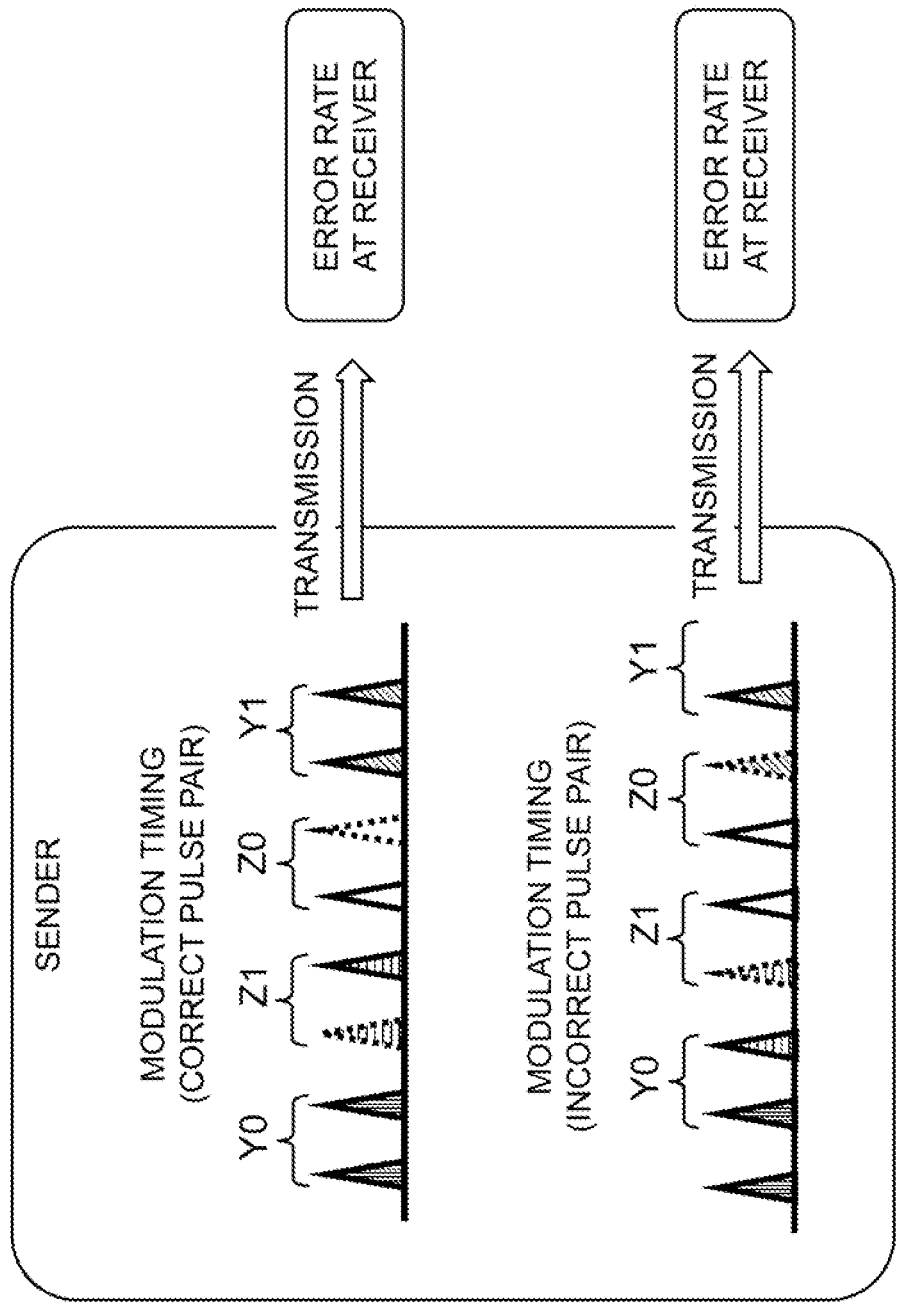
FIG. 2 is a schematic diagram for explaining a method of deciding the correctness or incorrectness of modulation timing as a background art.

The intensity-phase modulator 104, as described in FIG. 1, performs phase modulation or intensity modulation (phase-time coding) for each pulse pair on the output optical pulse train of the asymmetric interferometer 103. The output optical pulse train of the intensity-phase modulator 104 is output to the attenuator 106 through the optical splitter 105. A branched portion of the output pulse train of the intensity-phase modulator 104 enters the optical intensity measuring device 107. The attenuator 106 attenuates the optical intensity of the output optical pulse train of the intensity-phase modulator 104 to single-photon levels for transmission.

The optical intensity measuring device 107 inputs the output optical pulse train branched at the optical splitter 105 and measures the average optical intensity of the output optical pulses. In general, an optical sender is equipped with an optical sensor that monitors the output level (DC drift component) of modulated pulses (see Patent Literature 1 for instance). Such an optical sensor can be used as the optical intensity measuring device 107 in the present exemplary embodiment.

The optical sender 10 is provided with a processor 200 on which a modulation timing correctness deciding function according to the present exemplary embodiment can be implemented in addition to data processing for communication by executing programs stored in a program memory 201. According to the present exemplary embodiment, the function of a modulation timing correctness deciding section 202 is implemented in the processor 200. Under the control of the modulation timing correctness deciding section 202, a modulator driver 203 drives the intensity modulator 102 for decoy states and the intensity-phase modulator 104 for phase-time basis coding, respectively. The modulation timing correctness deciding section 202 controls the modulator driver 203 as described below, and decides whether the modulation timing is correct or incorrect, using the optical intensity data input from the optical intensity measuring device 107. A memory 204 is a working memory used for storing data such as light intensity data.

Figure 4:
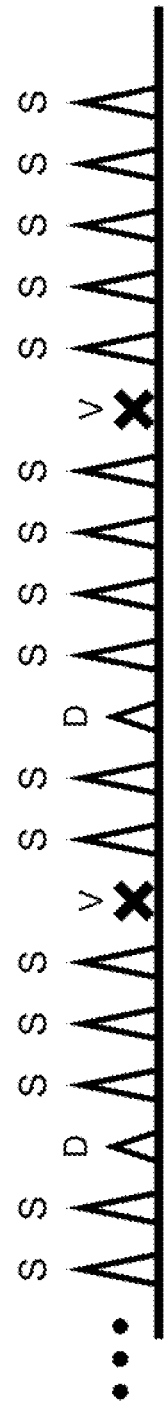
FIG. 4 is a schematic diagram illustrating an example of a decoy state method employed in the exemplary embodiment.

As illustrated in FIG. 4, a decoy state method is a method of randomly mixing pulses of different intensity as decoy states in sending light pulses. In most cases, three types of decoy states are used: signal light S (reference intensity), decoy light D (0.4×reference intensity), and vacuum V (zero intensity). These three types may be mixed, for example, at ratios of 90%, 5%, and 5%, respectively. In contrast, according to the modulation timing correctness deciding method of the present exemplary embodiment, the intensity modulator 102 modulates the light from the laser light source 101 The intensity modulator 102 performs intensity modulation, SN (signal light/vacuum), of optical pulse train input from the laser light source 101. Hereafter, the intensity modulation (S/V) by the intensity modulator 102 is referred to as decoy modulation.

In normal optical communications, the intensity-phase modulator 104 performs phase modulation or intensity modulation (Y0/Y1/Z0/Z1) on pulse pairs input from the asymmetric interferometer 103 according to send data bit 0/1 as shown in FIG. 1. In contrast, according to the modulation timing correctness deciding method of the present exemplary embodiment, the intensity-phase modulator 104 performs intensity modulation according to the time basis coding (Z0/Z1). Time basis coding (Z0/Z1) is intensity modulation in which any one pulse of a pulse pair is turned to zero intensity according to send data as shown in FIG. 1. Hereafter, the intensity modulation of time basis coding (Z0/Z1) by the intensity-phase modulator 104 is referred to as send-data modulation.

According to the present exemplary embodiment, the intensity modulator 102 performs decoy-modulation on an input optical pulse train from the laser light source 101 according to a SN pattern and performs send-data modulation on an output optical pulse train of the asymmetric interferometer 103 according to Z0/Z1 pattern. When either the SN pattern or the Z0/Z1 pattern is changed, the optical intensity of the output optical pulse train from the intensity-phase modulator 104 is monitored by the optical intensity measuring device 107. The modulation timing correctness deciding section 202 detects that the optical intensity changes or does not change before or after the pattern change. Based on the detection result, the modulation timing correctness deciding section 202 decides whether or not the intensity-phase modulator 104 performs the send-data modulation on a correct pulse pair, in other words, whether the modulation timing is correct or incorrect.

Hereafter, the operation of the modulation timing correctness deciding section 202 on the processor 200 will be described in detail referring to FIGS. 5-10.

1. First Example

Figure 5:
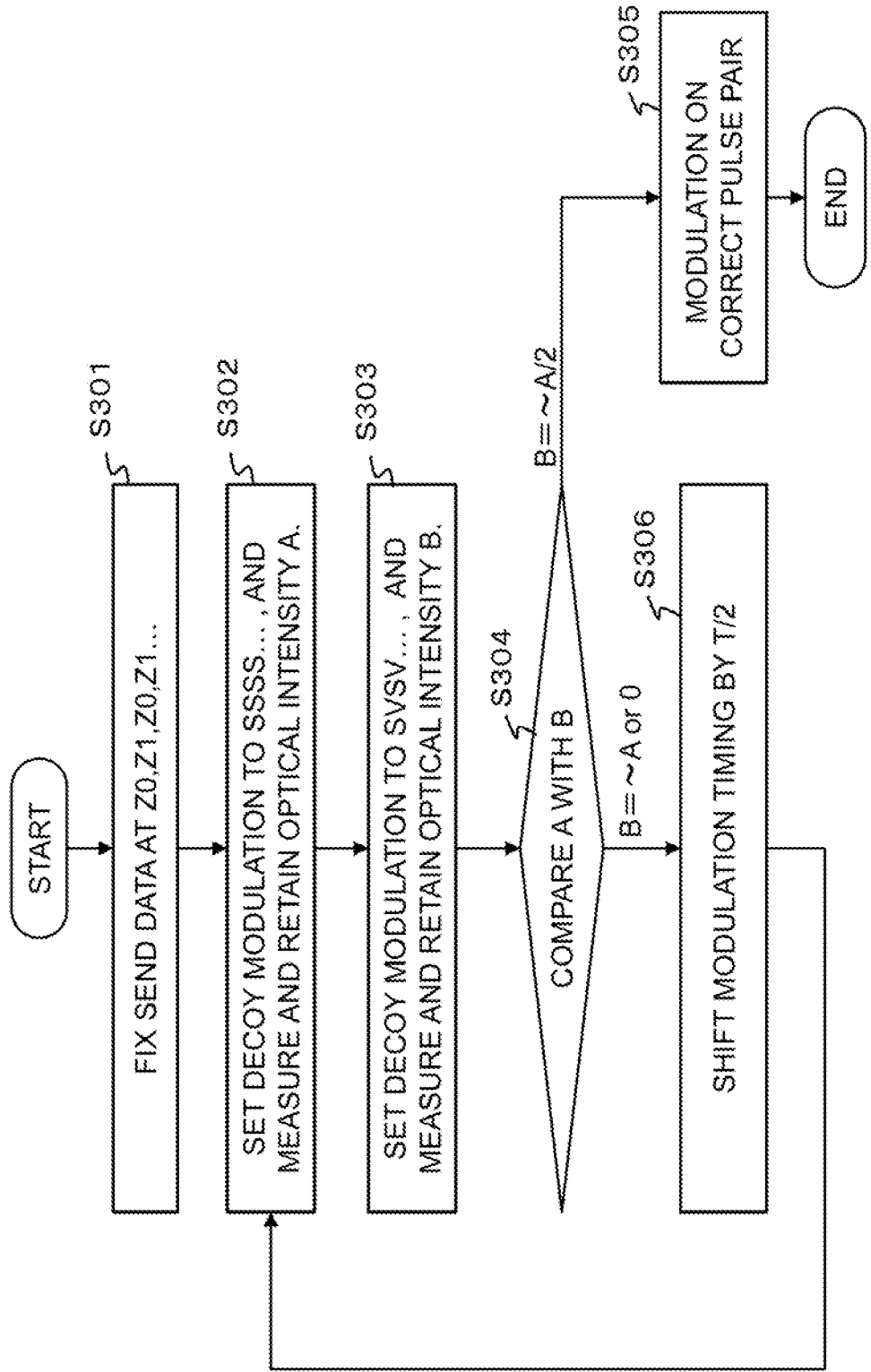
FIG. 5 is a flowchart illustrating the modulation timing correctness deciding method according to a first example of the present invention.
Figure 6:
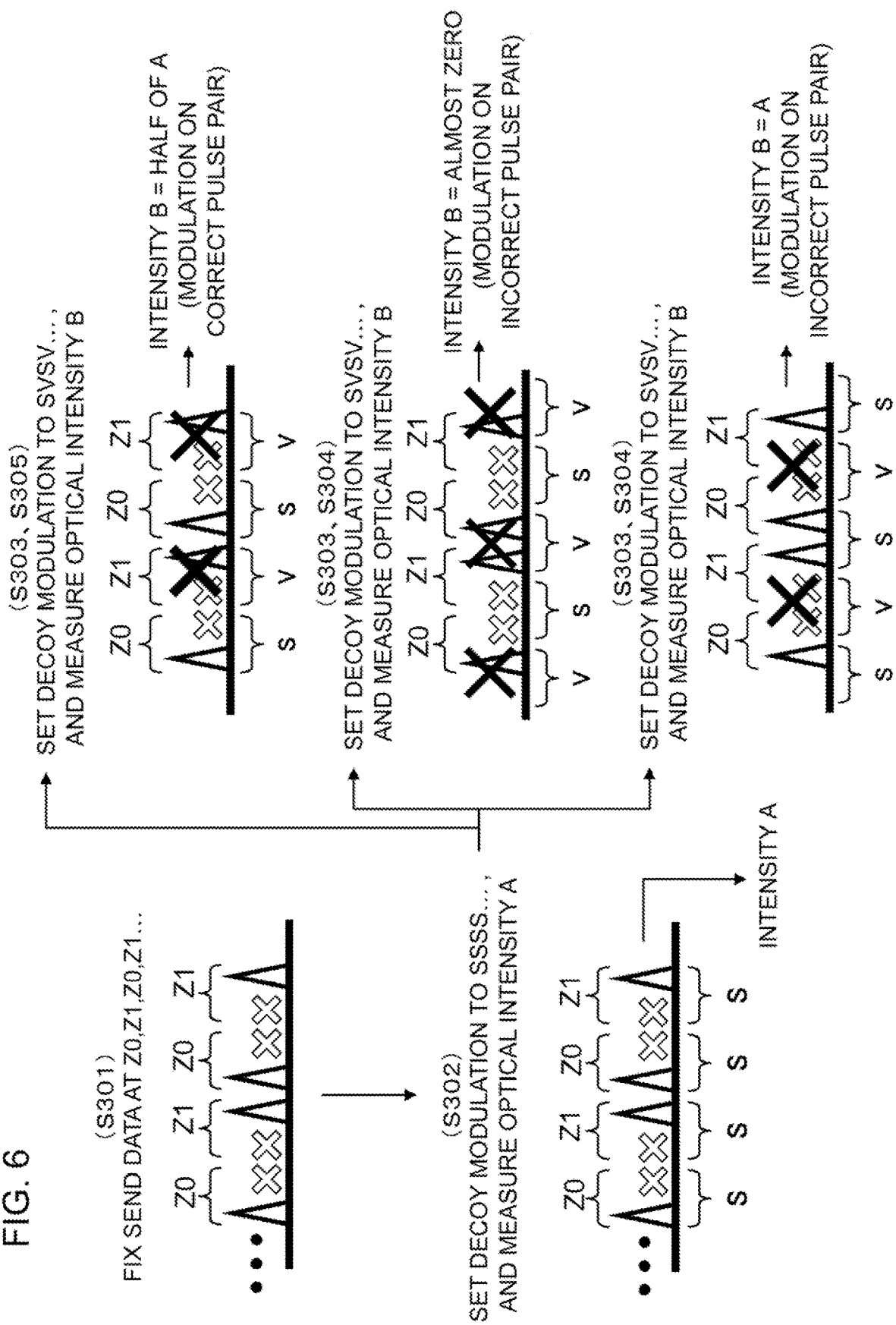
FIG. 6 is a pulse waveform diagram illustrating an example of optical pulse trains to which the modulation timing correctness deciding method as shown in FIG. 5 is applied.

According to a first example of the present invention, the send-data modulation pattern is fixed and the decoy modulation pattern is changed, thereby deciding the correctness or incorrectness of the modulation timing. FIG. 5 shows the operation flow of the present example, and FIG. 6 shows an example of a specific optical pulse train corresponding to the operation flow.

In FIG. 5, the modulation timing correctness deciding section 202 fixes the send-data modulation patten of the intensity-phase modulator 104 at "Z0, Z1, Z0, Z1 . . . " through the modulation driver 203 (Operation S301). Subsequently, the modulation timing correctness deciding section 202 sets the decoy modulation pattern of the intensity modulator 102 to "SSSS . . . " through the modulation driver 203. The modulation timing correctness deciding section 202 inputs the average optical intensity A of the output optical pulse train of the intensity-phase modulator 104 at the time from the optical intensity measurement device 107 and retains it in the memory 204 (Operation S302).

Subsequently, the modulation timing correctness deciding section 202 changes the decoy modulation pattern of the intensity modulator 102 from "SSSS . . . " to "SVSV . . . " through the modulator driver 203. The modulation timing correctness deciding section 202 inputs the average optical intensity B of the output optical pulse train of the intensity-phase modulator 104 at the time from the optical intensity measurement device 107 and retains it in the memory 204 (Operation S303).

Subsequently, the modulation timing correctness deciding section 202 compares the optical intensity A with the optical intensity B stored in the memory 204 (Operation S304). If the optical intensity B is almost half the optical intensity A (B=~A/2), then it is decided that the pulse pair subjected to send-data modulation is a double pulse (correct pulse pair), which causes the process to be terminated (Operation S305).

On the other hand, if the optical intensity B is approximately equal to the optical intensity A or approximately zero (B=~A or 0), then it is determined that the pulse pair subjected to send-data modulation is not a double pulse, i.e., it is an incorrect pulse pair. When the send-data modulation has been performed on the incorrect pulse pair, the modulation timing correctness deciding section 202 shifts the timing of send-data modulation of the intensity-phase modulator 104 by T/2 through the modulator driver 203 (Operation S306) and then the above-mentioned operations S302 to S304 are performed again. When the optical intensity B becomes almost half the optical intensity A (B=~A/2), it is decided that the pulse pair subjected to the send-data modulation is the correct pulse pair, which causes the process to be terminated (Operation S305). Next, referring to FIG. 6, the above operations S301 to S306 will be explained with reference to an example of an optical pulse train.

As illustrated in (S301) of FIG. 6, the send-data modulation patten is fixed at "Z0, Z1, Z0, Z1 . . . ", thereby repeating the intensity modulation of Z0 and Z1 on the output optical pulse train of the asymmetric interferometer 103.

Next, as illustrated in (S302) of FIG. 6, the decoy modulation pattern is set to "SSSS . . . ". Since the output pulse train of the laser light source 101 has no optical pulse of zero intensity, the intensity-phase modulator 104 outputs an optical pulse train according to send-data modulation pattern "Z0, Z1, Z0, Z1, . . . ". In this way, the average optical intensity A is retained in the memory 204.

Subsequently, as illustrated in (S303, S305) of FIG. 6, when changing the decoy modulation pattern from "SSSS . . . " to "SVSV . . . ", only the double pulses corresponding to optical pulses involved in "V" of the decoy modulation pattern become zero intensity. In other words, the "S" and "V" of the decoy modulation pattern can be an indicator of the position of a double pulse. If a pulse pair is a correct double pulse that is correctly modulated by the send-data modulation pattern "Z0, Z1, Z0, Z1 . . . ", then among send-data modulation pattern "Z0, Z1, Z0, Z1 . . . ", only a pulse pair "Z1" becomes zero intensity, and a pulse pair "Z0" is output as it is. The average optical intensity B of the optical pulse train is retained in the memory 204. Accordingly, If double pulses (correct pulse pairs) are modulated according to the send-data modulation pattern "Z0, Z1, Z0, Z1 . . . ", then the optical intensity B may be ½ of the optical intensity A.

In contrast, as illustrated in (S303, S304) of FIG. 6, assuming that a pulse pair modulated according to the send-data modulation pattern "Z0, Z1, Z0, Z1 . . . " is shifted backward by one pulse (T/2) from a double pulse, all pulses would have zero intensity, and the average optical intensity B would be almost zero. Assuming that a pulse pair modulated according to the send-data modulation pattern "Z0, Z1, Z0, Z1 . . . " is shifted forward by one pulse (T/2) from a double pulse, two optical pulses at the "S" position of the decoy modulation pattern become the reference intensity, and the average optical intensity B becomes almost equal to A.

A pulse pair subjected to the send-data modulation is shifted either forward or backward by T/2 from the double pulse. Accordingly, the value of average optical intensity B is one of A/2, 0 and A, and is limited to these three values. Therefore, it can be decided that the pulse pair is a "correct pulse pair" if the average light intensity B=A/2, and a "incorrect pulse pair" if the average light intensity B is other than A/2. In the case where the send-data modulation is being performed on the incorrect pulse pair, the send-data modulation timing may be simply shifted forward or backward by T/2, allowing the send-data modulation to be performed on correct pulse pairs.

2. Second Example

Figure 7:
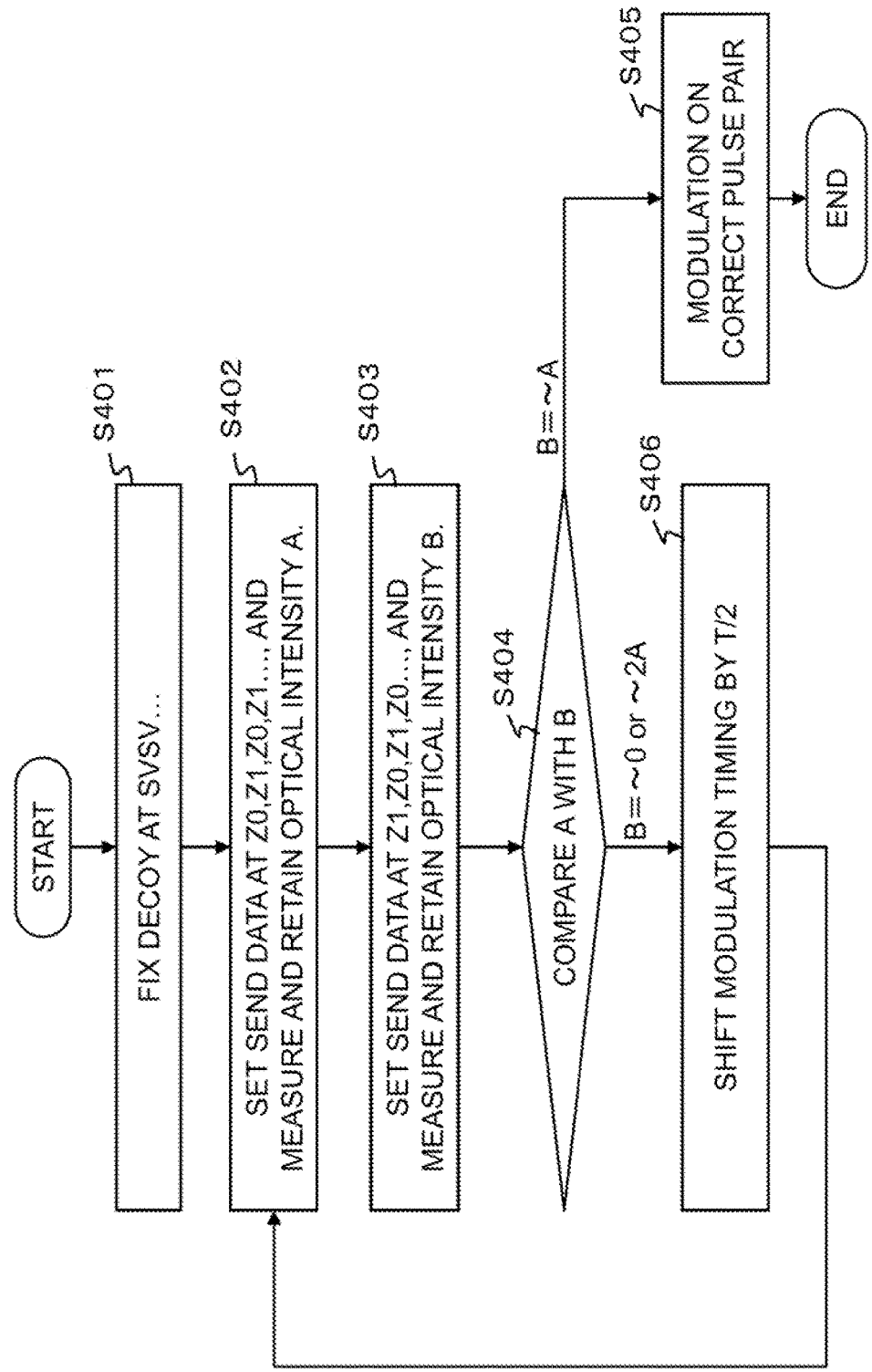
FIG. 7 is a flowchart illustrating the modulation timing correctness deciding method according to a second example of the present invention.
Figure 8:
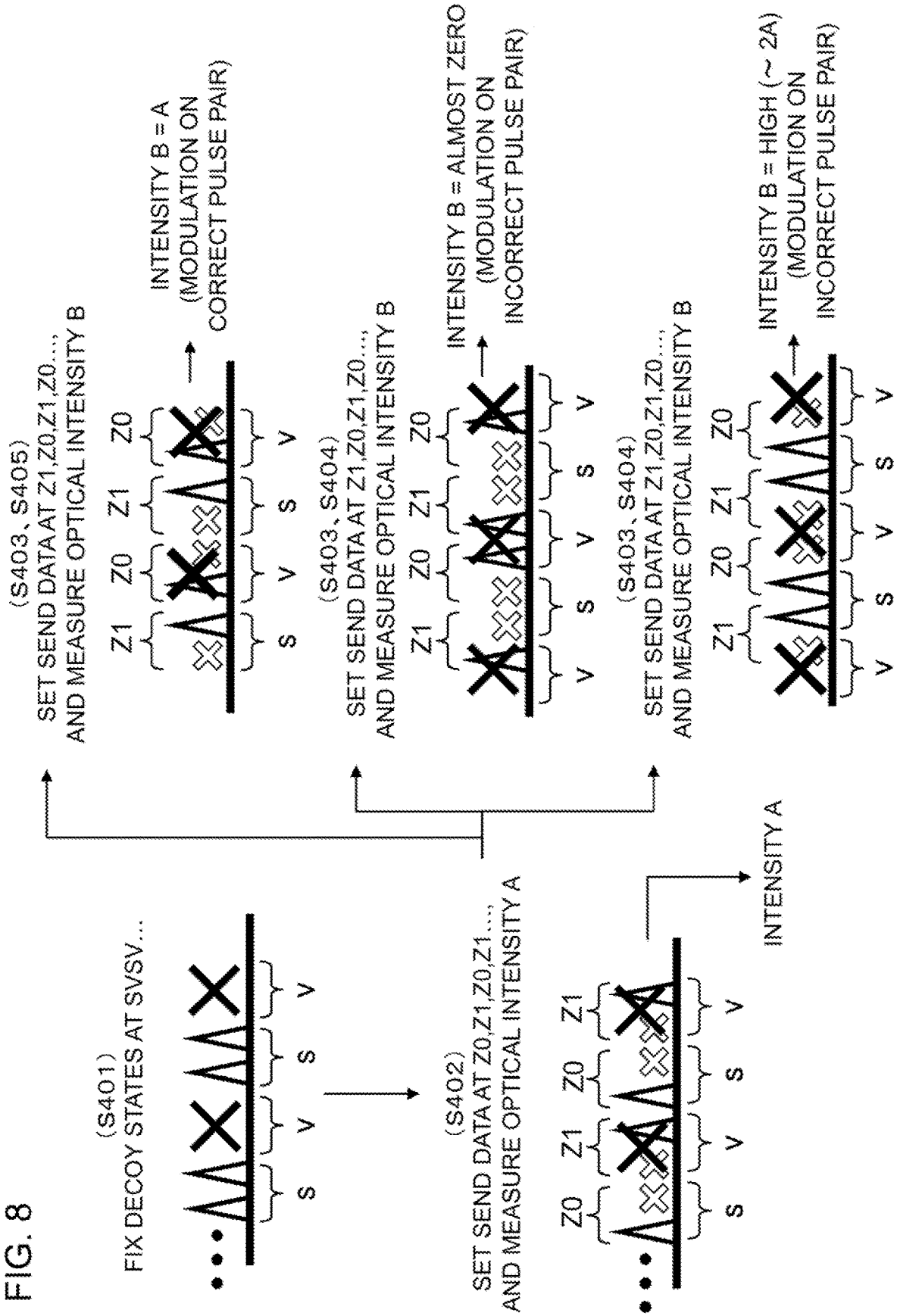
FIG. 8 is a pulse waveform diagram illustrating an example of optical pulse trains to which the modulation timing correctness deciding method as shown in FIG. 7 is applied.

According to a second example of the present invention, the decoy modulation pattern is fixed and the send-data modulation pattern is changed, thereby deciding the correctness or incorrectness of the modulation timing. FIG. 7 shows the operation flow of the present example, and FIG. 8 shows an example of a specific optical pulse train corresponding to the operation flow.

In FIG. 7, the modulation timing correctness deciding section 202 fixes the decoy modulation pattern of the intensity modulator 102 at "SVSV . . . " through the modulation driver 203 (Operation S401). Subsequently, the modulation timing correctness deciding section 202 sets the send-data modulation pattern of the intensity-phase modulator 104 to "Z0, Z1, Z0, Z1, . . . ." through the modulation driver 203. The modulation timing correctness deciding section 202 inputs the average optical intensity A of the output optical pulse train of the intensity-phase modulator 104 at the time from the optical intensity measurement device 107 and retains it in the memory 204 (Operation S402).

Subsequently, the modulation timing correctness deciding section 202 inverts the send-data modulation pattern of the intensity-phase modulator 104 from "Z0, Z1, Z0, Z1, . . . " to "Z1, Z0, Z1, Z0, . . . " through the modulator driver 203. The modulation timing correctness deciding section 202 inputs the average optical intensity B of the output optical pulse train of the intensity-phase modulator 104 at the time from the optical intensity measurement device 107 and retains it in the memory 204 (Operation S403).

Subsequently, the modulation timing correctness deciding section 202 compares the optical intensity A with the optical intensity B stored in the memory 204 (Operation S404). If the optical intensity B is approximately equal to the optical intensity A (B=~A), then it is decided that the pulse pair subjected to send-data modulation is a double pulse (correct pulse pair), which causes the process to be terminated (Operation S405).

On the other hand, if the optical intensity B is approximately zero or twice the optical intensity A (B=~0 or ~2A), then it is decided that the pulse pair subjected to send-data modulation is not a double pulse, i.e., it is an incorrect pulse pair. When the send-data modulation has been performed on the incorrect pulse pair, the modulation timing correctness deciding section 202 shifts the timing of send-data modulation of the intensity-phase modulator 104 by T/2 through the modulator driver 203 (Operation S406) and then the above-mentioned operations S402 to S404 are performed again. When the optical intensity B becomes approximately equal to the optical intensity A (B=~A), it is decided that the pulse pair subjected to the send-data modulation is the correct pulse pair, which causes the process to be terminated (Operation S405). Next, referring to FIG. 8, the above operations S401 to S406 will be explained with reference to an example of an optical pulse train.

As illustrated in (S401) of FIG. 8, the decoy modulation pattern of the intensity modulator 102 is fixed at "SVSV . . . ", thereby repeating the intensity modulation on the output optical pulse train of the asymmetric interferometer 103 such that the double pulses corresponding to optical pulses involved in "S" become the reference intensity and the double pulses corresponding to optical pulses involved in "V" become zero intensity.

Next, as illustrated in (S402) of FIG. 8, it is assumed that the send-data modulation pattern is set at "Z0, Z1, Z0, Z1, . . . " and the double pulse corresponding to "S" is modulated according to "Z0". In this case, the average optical intensity A of the output optical pulse train of the intensity-phase modulator 104 is retained in the memory 204.

Subsequently, as illustrated in (S403, S405) of FIG. 8, the send-data modulation pattern is inverted from "Z0, Z1, Z0, Z1, . . . " to "Z1, Z0, Z1, Z0, . . . " and the average optical intensity B of the output optical pulse train of the intensity-phase modulator 104 at the time is input from the optical intensity measurement device 107 and retained in the memory 204. If a pulse pair subjected to send-data modulation is a correct double pulse, then modulation on the double pulse corresponding to "S" is merely changed from "Z0" to "Z1". Accordingly, the optical intensity B may be equal to the optical intensity A.

In contrast, as illustrated in (S403, S404) of FIG. 8, if a pulse pair modulated according to the send-data modulation pattern "Z0, Z1, Z0, Z1 . . . " is shifted backward by one pulse (T/2) from a double pulse, all pulses would have zero intensity. If a pulse pair modulated according to the send-data modulation pattern "Z0, Z1, Z0, Z1 . . . " is shifted forward by one pulse (T/2) from a double pulse, then two optical pulses at the "S" position of the decoy modulation pattern become the reference intensity, and the average optical intensity B becomes approximately twice the average optical intensity A.

A pulse pair subjected to the send-data modulation is shifted either forward or backward by T/2 from the double pulse. Accordingly, the value of average optical intensity B is one of ~A, ~0 or ~2A, and is limited to these three values. Therefore, it can be decided that the pulse pair is a "correct pulse pair" if the average light intensity B=~A, and a "incorrect pulse pair" if the average light intensity B is other than ~A. In the case where the send-data modulation is being performed on the incorrect pulse pair, the send-data modulation timing may be simply shifted forward or backward by T/2, allowing the send-data modulation to be performed on correct pulse pairs.

3. Third Example

Figure 9:
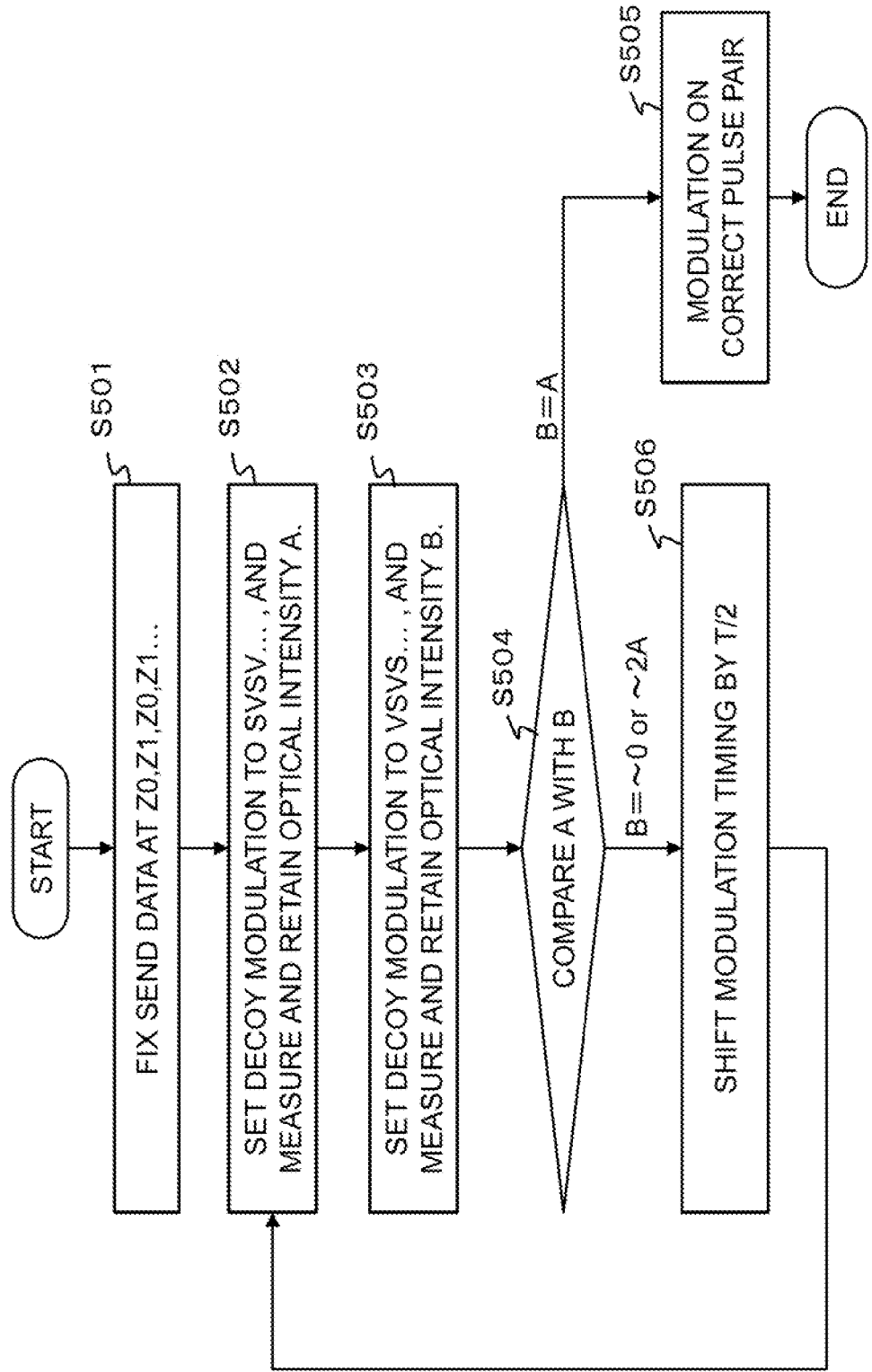
FIG. 9 is a flowchart illustrating the modulation timing correctness deciding method according to a third example of the present invention.
Figure 10:
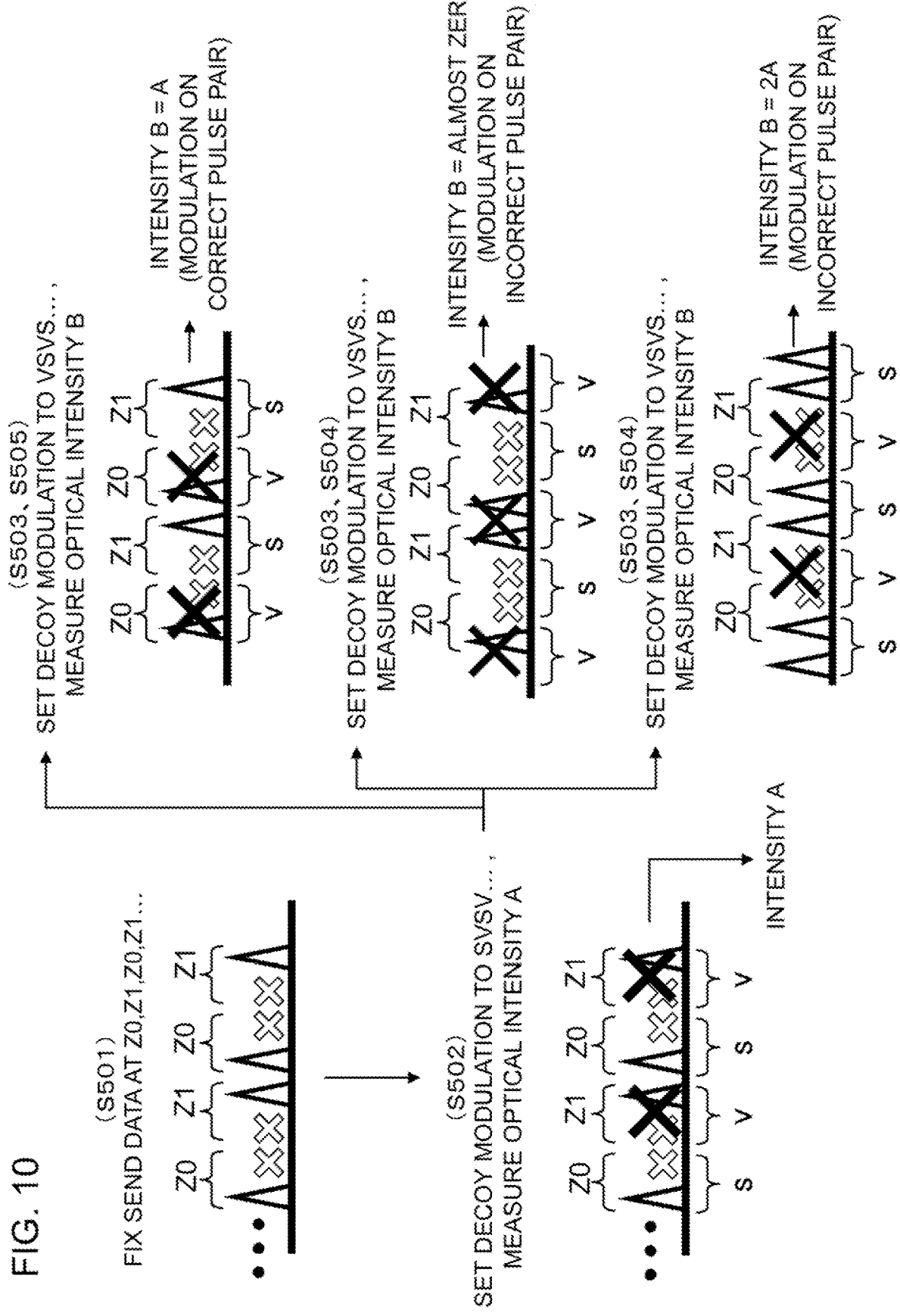
FIG. 10 is a pulse waveform diagram illustrating an example of optical pulse trains to which the modulation timing correctness deciding method as shown in FIG. 9 is applied.

According to a third example of the present invention, the send-data modulation pattern is fixed and the decoy modulation pattern is changed, thereby deciding the correctness or incorrectness of the modulation timing. FIG. 9 shows the operation flow of the present example, and FIG. 10 shows an example of a specific optical pulse train corresponding to the operation flow.

In FIG. 9, the modulation timing correctness deciding section 202 fixes the send-data modulation patten of the intensity-phase modulator 104 at "Z0, Z1, Z0, Z1 . . . " through the modulation driver 203 (Operation S501). Subsequently, the modulation timing correctness deciding section 202 sets the decoy modulation pattern of the intensity modulator 102 to "SVSV . . . " through the modulation driver 203. The modulation timing correctness deciding section 202 inputs the average optical intensity A of the output optical pulse train of the intensity-phase modulator 104 at the time from the optical intensity measurement device 107 and retains it in the memory 204 (Operation S502).

Subsequently, the modulation timing correctness deciding section 202 inverts the decoy modulation pattern of the intensity modulator 102 from "SVSV . . . " to "VSVS . . . " through the modulator driver 203. The modulation timing correctness deciding section 202 inputs the average optical intensity B of the output optical pulse train of the intensity-phase modulator 104 at the time from the optical intensity measurement device 107 and retains it in the memory 204 (Operation S503).

Subsequently, the modulation timing correctness deciding section 202 compares the optical intensity A with the optical intensity B stored in the memory 204 (Operation S504). If the optical intensity B is approximately equal to the optical intensity A (B=~A), then it is decided that the pulse pair subjected to send-data modulation is a double pulse (correct pulse pair), which causes the process to be terminated (Operation S505).

On the other hand, if the optical intensity B is approximately zero or twice the optical intensity A (B=~0 or ~2A), then it is determined that the pulse pair subjected to send-data modulation is not a double pulse, i.e., it is an incorrect pulse pair. When the send-data modulation has been performed on the incorrect pulse pair, the modulation timing correctness deciding section 202 shifts the timing of send-data modulation of the intensity-phase modulator 104 by T/2 through the modulator driver 203 (Operation S506) and then the above-mentioned operations S502 to S504 are performed again. When the optical intensity B becomes approximately equal to the optical intensity A (B=~A), it is decided that the pulse pair subjected to the send-data modulation is the correct pulse pair, which causes the process to be terminated (Operation S505). Next, referring to FIG. 10, the above operations S501 to S506 will be explained with reference to an example of an optical pulse train.

As illustrated in (S501) of FIG. 10, the send-data modulation patten is fixed at "Z0, Z1, Z0, Z1 . . . ", thereby repeating the intensity modulation of Z0 and Z1 on the output optical pulse train of the asymmetric interferometer 103.

Next, as illustrated in (S502) of FIG. 10, the decoy modulation pattern is set to "SVSV . . . ", which causes the output pulse train of the laser light source 101 to become zero intensity every other pulse. Assuming that the intensity-phase modulator 104 performs send-data modulation of "Z0" on a double pulse of optical pulses corresponding to "S", the average light intensity A at the time is retained in the memory 204.

Subsequently, as illustrated in (S503, S505) of FIG. 10, when inverting the decoy modulation pattern from "SVSV . . . " to "VSVS . . . ", only the double pulses corresponding to optical pulses involved in "V" of the decoy modulation pattern become zero intensity. If a pulse pair is a correct double pulse that is correctly modulated by the send-data modulation pattern "Z0, Z1, Z0, Z1 . . . ", then among send-data modulation pattern "Z0, Z1, Z0, Z1 . . . ", only a pulse pair "Z0" becomes zero intensity, and a pulse pair "Z1" is output as it is. The average optical intensity B of the optical pulse train is retained in the memory 204. Accordingly, If double pulses (correct pulse pairs) are modulated according to the send-data modulation pattern "Z0, Z1, Z0, Z1 . . . ", then the optical intensity B may be approximately equal to the optical intensity A.

In contrast, as illustrated in (S503, S504) of FIG. 10, assuming that a pulse pair modulated according to the send-data modulation pattern "Z0, Z1, Z0, Z1 . . . " is shifted backward by one pulse (T/2) from a double pulse, all pulses would have zero intensity, and the average optical intensity B would be almost zero. Assuming that a pulse pair modulated according to the send-data modulation pattern "Z0, Z1, Z0, Z1 . . . " is shifted forward by one pulse (T/2) from a double pulse, two optical pulses at the "S" position of the decoy modulation pattern become the reference intensity, and the average optical intensity B becomes approximately twice the optical intensity A.

A pulse pair subjected to the send-data modulation is shifted either forward or backward by T/2 from the double pulse. Accordingly, the value of average optical intensity B is one of ~A, ~0 and ~2A, and is limited to these three values. Therefore, it can be decided that the pulse pair is a "correct pulse pair" if the average light intensity B=~A, and a "incorrect pulse pair" if the average light intensity B is other than ~A. In the case where the send-data modulation is being performed on the incorrect pulse pair, the send-data modulation timing may be simply shifted forward or backward by T/2, allowing the send-data modulation to be performed on correct pulse pairs.

4. Example of Application to QKD System

The optical sender 10 with the modulation timing correctness deciding function described above may be applied to an optical sender (ALICE) for a QKD system.

Figure 11:
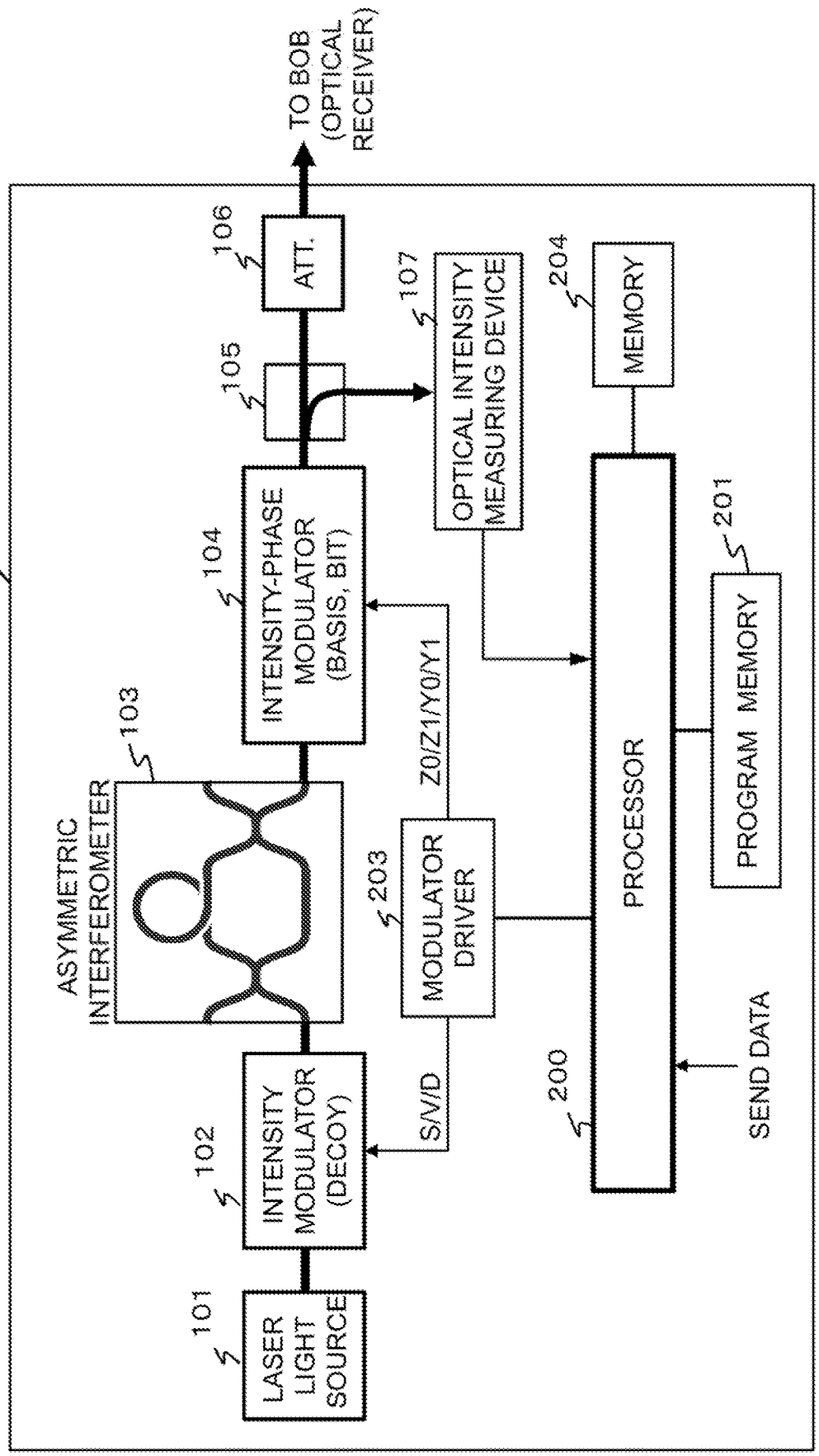
FIG. 11 is a block diagram illustrating the schematic configuration of an optical sender to which the modulation timing correctness deciding method according o an exemplary embodiment of the invention is applied.

As illustrated in FIG. 11, the ALICE 100 of the QKD system has approximately the same basic configuration as the optical sender 10 as shown in FIG. 3. Accordingly, the same reference numbers are used and their detailed descriptions are omitted. In the ALICE 100, a processor 200 implements the modulation timing correctness deciding function as described above. Furthermore, the processor 200 drives the intensity-phase modulator 104 to perform send-data modulation on a double pulse train output from the asymmetric interferometer 103 according the phase-time basis coding as shown in FIG. 1. The double pulse train modulated according to the send-data modulation is attenuated to single-photon levels by the attenuator 106. The attenuated double pulse train is sent to the BOB (optical receiver) through the optical transmission line.

Figure 12:
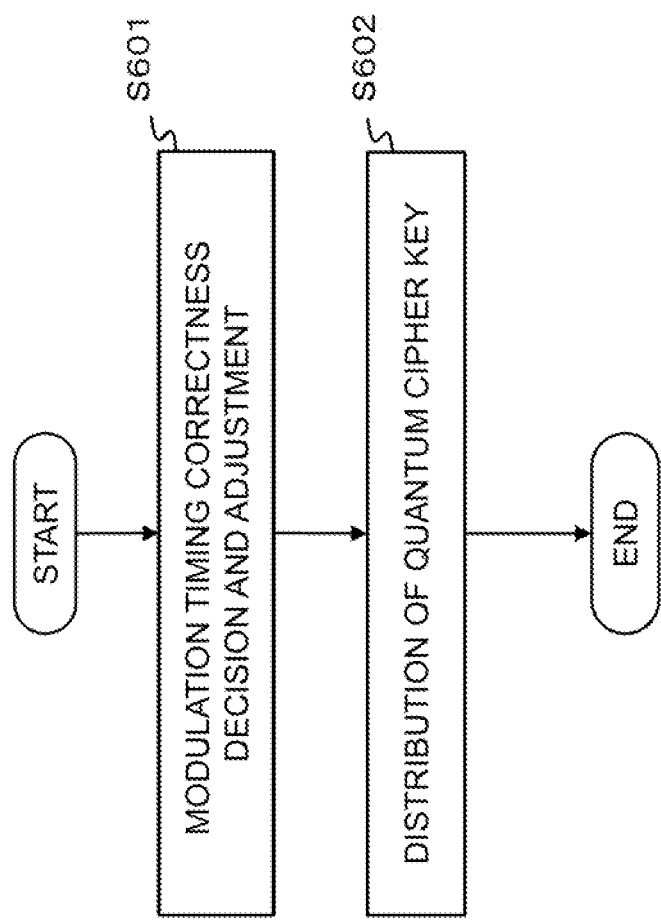
FIG. 12 is a flowchart illustrating the operation of the optical sender as shown in FIG. 11.

As illustrated in FIG. 12, in the ALICE 100, the processor 200 performs intensity-modulation (SN) through the intensity modulator 102 and send-data modulation (Z0/Z1) through the intensity-phase modulator 104. The processor 200 further performs the modulation timing correctness deciding function as described above while monitoring the optical intensity measurements input from the optical intensity measuring device 107 and, if modulation is performed on incorrect pulse pairs, adjustment is made by shifting the timing (Operation S601).

In this manner, the modulation timing is corrected. Subsequently, the processor 200 performs intensity-modulation (S/V/D) through the intensity modulator 102 and send-data modulation (Y0/Y1/Z0/Z1) through the intensity-phase modulator 104 according to a quantum cipher key (random number) to distribute the quantum cipher key (random number) (Operation S602). According to the present exemplary embodiment, the modulation timing adjustment can be made by the ALICE 100 alone (Operation S601). Accordingly, the sender alone can adjust the modulation timing correctly when initially adjusting the sender-side devices or when a failure occurs.

5. Supplementary Notes

The whole or part of the example embodiments disclosed above can be described as, but not limited to, the following supplementary notes.

SUPPLEMENTARY NOTE 1

An optical sender that modulates an optical pulse train having a predetermined period for data sending, comprising:
a first modulator that performs intensity modulation on the optical pulse train to output a first optical pulse train, wherein the intensity modulation is performed at least between a reference intensity and a zero intensity;
an asymmetric interferometer that inputs the first optical pulse train and outputs a second optical pulse train of double pulses, wherein each double pulse is generated by temporally separating each optical pulse of the first optical pulse train;
a second modulator that performs send-data modulation for each pulse pair of the second optical pulse train to output a third optical pulse train;
an optical intensity measuring device that measures an optical intensity of the third optical pulse train; and a controller that controls the intensity modulation of the first modulator and the send-data modulation of the second modulator,
wherein the controller is configured to:
generate each double pulse of the second optical pulse train having the reference intensity or the zero intensity depending on the intensity modulation of the first optical pulse train according to an intensity modulation pattern;
generate each pulse pair of the second optical pulse train with either pulse of the pulse pair having the zero intensity depending on the send-data modulation according to a send-data modulation pattern; and
decide whether or not the pulse pair is the double pulse, based on an optical intensity of the third optical pulse train when changing either of the intensity modulation pattern and the send-data modulation pattern.

SUPPLEMENTARY NOTE 2

The optical sender according to supplementary note 1, wherein the optical intensity measuring device measures an average optical intensity of the third optical pulse train.

SUPPLEMENTARY NOTE 3

The optical sender according to supplementary note 1 or 2, wherein the controller is configured to:
change either of the intensity modulation pattern and the send-data modulation pattern; and decide whether or not the pulse pair is the double pulse, based on a comparison result between a first optical intensity of the third optical pulse train before pattern change and a second optical intensity of the third optical pulse train after pattern change.

SUPPLEMENTARY NOTE 4

The optical sender according to any one of supplementary notes 1-3, wherein, assuming that the optical pulse train has the reference intensity,
the intensity modulation pattern includes a first intensity modulation pattern and a second intensity modulation pattern, wherein the first intensity modulation pattern causes the second optical pulse train to repeat a double pulse of the reference intensity, wherein the second intensity modulation pattern causes the second optical pulse train to repeat the reference intensity and the zero intensity every other double pulse by the optical pulse train repeatedly alternating between the reference intensity and the zero intensity every other pulse,
the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity,
the controller is configured to decide whether or not the pulse pair is the double pulse, by comparing a first optical intensity of the third optical pulse train with a second optical intensity of the third optical pulse train, wherein the first optical intensity is measured when the send-data modulation pattern is fixed and the intensity modulation pattern is set at the first intensity modulation pattern, wherein the second optical intensity is measured when the intensity modulation pattern is changed to the second intensity modulation patten.

SUPPLEMENTARY NOTE 5

The optical sender according to any one of supplementary notes 1-3, wherein
the intensity modulation pattern causes the second optical pulse train to repeat the reference intensity and the zero intensity every other double pulse by the optical pulse train repeatedly alternating between the reference intensity and the zero intensity every other pulse,
the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity,
the controller is configured to decide whether or not the pulse pair is the double pulse, by comparing a first optical intensity of the third optical pulse train with a second optical intensity of the third optical pulse train, wherein the first optical intensity is measured when one pattern of the intensity modulation pattern and the send-data modulation pattern is fixed and the other pattern is set at a predetermined pattern, wherein the second optical intensity is measured when the other pattern is inverted.

SUPPLEMENTARY NOTE 6

The optical sender according to any one of supplementary notes 1-5, wherein
the first modulator is an intensity modulator that performs intensity modulation according to a decoy state method,
the second modulator is an intensity-phase modulator that performs phase modulation on the pulse pair or intensity modulation such that any one pulse of the pulse pair has zero intensity according to the send data, and
the optical intensity measuring device uses an optical detector that monitors the optical intensity of the third optical pulse train,
wherein the controller adjusts modulation timing of the second modulator such that the pulse pair becomes the double pulse.

SUPPLEMENTARY NOTE 7

A modulation timing correctness deciding method in an optical sender that modulates an optical pulse train having a predetermined period for data sending, the method comprising:
by a first modulator, performing intensity modulation on the optical pulse train to output a first optical pulse train, wherein the intensity modulation is performed at least between a reference intensity and a zero intensity;
by an asymmetric interferometer, inputting the first optical pulse train and outputting a second optical pulse train of double pulses, wherein each double pulse is generated by temporally separating each optical pulse of the first optical pulse train;
by a second modulator, performing send-data modulation for each pulse pair of the second optical pulse train to output a third optical pulse train;
by an optical intensity measuring device, measuring an optical intensity of the third optical pulse train; and
a controller, controlling the intensity modulation of the first modulator and the send-data modulation of the second modulator, thereby:
generating each double pulse of the second optical pulse train having the reference intensity or the zero intensity depending on the intensity modulation of the first optical pulse train according to an intensity modulation pattern;
generating each pulse pair of the second optical pulse train with either pulse of the pulse pair having the zero intensity depending on the send-data modulation according to a send-data modulation pattern; and
deciding whether or not the pulse pair is the double pulse, based on an optical intensity of the third optical pulse train when changing either of the intensity modulation pattern and the send-data modulation pattern.

SUPPLEMENTARY NOTE 8

The modulation timing correctness deciding method according to supplementary note 7, comprising, by the optical intensity measuring device, measuring an average optical intensity of the third optical pulse train.

SUPPLEMENTARY NOTE 9

The modulation timing correctness deciding method according to supplementary note 7 or 8, comprising, by the controller,
  changing either of the intensity modulation pattern and the send-data modulation pattern; and
  deciding whether or not the pulse pair is the double pulse, based on a comparison result between a first optical intensity of the third optical pulse train before pattern change and a second optical intensity of the third optical pulse train after pattern change.

SUPPLEMENTARY NOTE 10

The modulation timing correctness deciding method according to any one of supplementary notes 7-9, wherein, assuming that the optical pulse train has the reference intensity,
  the intensity modulation pattern includes a first intensity modulation pattern and a second intensity modulation pattern, wherein the first intensity modulation pattern causes the second optical pulse train to repeat a double pulse of the reference intensity, wherein the second intensity modulation pattern causes the second optical pulse train to repeat the reference intensity and the zero intensity every other double pulse by the optical pulse train repeatedly alternating between the reference intensity and the zero intensity every other pulse,
  the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity,
  the method comprising, by the controller,
  deciding whether or not the pulse pair is the double pulse, by comparing a first optical intensity of the third optical pulse train with a second optical intensity of the third optical pulse train, wherein the first optical intensity is measured when the send-data modulation pattern is fixed and the intensity modulation pattern is set at the first intensity modulation pattern, wherein the second optical intensity is measured when the intensity modulation pattern is changed to the second intensity modulation patten.

SUPPLEMENTARY NOTE 11

The modulation timing correctness deciding method according to any one of supplementary notes 7-9, wherein
  the intensity modulation pattern causes the second optical pulse train to repeat the reference intensity and the zero intensity every other double pulse by the optical pulse train repeatedly alternating between the reference intensity and the zero intensity every other pulse,
  the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity,
  the method comprising, by the controller,
  deciding whether or not the pulse pair is the double pulse, by comparing a first optical intensity of the third optical pulse train with a second optical intensity of the third optical pulse train, wherein the first optical intensity is measured when one pattern of the intensity modulation pattern and the send-data modulation pattern is fixed and the other pattern is set at a predetermined pattern, wherein the second optical intensity is measured when the other pattern is inverted.

SUPPLEMENTARY NOTE 12

A program for functioning a computer as a controller of an optical sender including: a first modulator that performs intensity modulation on the optical pulse train to output a first optical pulse train, wherein the intensity modulation is performed at least between a reference intensity and a zero intensity; an asymmetric interferometer that inputs the first optical pulse train and outputs a second optical pulse train of double pulses, wherein each double pulse is generated by temporally separating each optical pulse of the first optical pulse train; a second modulator that performs send-data modulation for each pulse pair of the second optical pulse train to output a third optical pulse train; and an optical intensity measuring device that measures an optical intensity of the third optical pulse train,
  the program functioning the computer, comprising functions of:
  generating each double pulse of the second optical pulse train having the reference intensity or the zero intensity depending on the intensity modulation of the first optical pulse train according to an intensity modulation pattern;
  generating each pulse pair of the second optical pulse train with either pulse of the pulse pair having the zero intensity depending on the send-data modulation according to a send-data modulation pattern; and
  deciding whether or not the pulse pair is the double pulse, based on an optical intensity of the third optical pulse train when changing either of the intensity modulation pattern and the send-data modulation pattern.

SUPPLEMENTARY NOTE 13

The program according to supplementary note 12, comprising, by the optical intensity measuring device, measuring an average optical intensity of the third optical pulse train.

SUPPLEMENTARY NOTE 14

The program according to supplementary note 12 or 13, comprising functions of:
  changing either of the intensity modulation pattern and the send-data modulation pattern; and
  deciding whether or not the pulse pair is the double pulse, based on a comparison result between a first optical intensity of the third optical pulse train before pattern change and a second optical intensity of the third optical pulse train after pattern change.

SUPPLEMENTARY NOTE 15

The program according to any one of supplementary notes 12-14, wherein, assuming that the optical pulse train has the reference intensity, the intensity modulation pattern includes a first intensity modulation pattern and a second intensity modulation pattern, wherein the first intensity modulation pattern causes the second optical pulse train to repeat a double pulse of the reference intensity, wherein the second intensity modulation pattern causes the second optical pulse train to repeat the reference intensity and the zero intensity every other double pulse by the optical pulse train repeatedly alternating between the reference intensity and the zero intensity every other pulse, the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity, the program comprising functions of:

deciding whether or not the pulse pair is the double pulse, by comparing a first optical intensity of the third optical pulse train with a second optical intensity of the third optical pulse train, wherein the first optical intensity is measured when the send-data modulation pattern is fixed and the intensity modulation pattern is set at the first intensity modulation pattern, wherein the second optical intensity is measured when the intensity modulation pattern is changed to the second intensity modulation patten.

SUPPLEMENTARY NOTE 16

The program according to any one of supplementary notes 12-14, wherein the intensity modulation pattern causes the second optical pulse train to repeat the reference intensity and the zero intensity every other double pulse by the optical pulse train repeatedly alternating between the reference intensity and the zero intensity every other pulse, the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity, the program comprising functions of:

deciding whether or not the pulse pair is the double pulse, by comparing a first optical intensity of the third optical pulse train with a second optical intensity of the third optical pulse train, wherein the first optical intensity is measured when one pattern of the intensity modulation pattern and the send-data modulation pattern is fixed and the other pattern is set at a predetermined pattern, wherein the second optical intensity is measured when the other pattern is inverted.

SUPPLEMENTARY NOTE 17

A quantum key distribution (QKD) system comprising the optical sender according to any one of supplementary notes 1-7.

INDUSTRIAL APPLICABILITY

The invention is applicable to QKD systems including asymmetric interferometers.

DESCRIPTION OF SIGN

10 Optical sender
101 Laser light source
102 Intensity modulator (decoy)
103 Asymmetric interferometer
104 Intensity-phase modulator (basis, bit)
105 Optical splitter
106 Attenuator
107 Optical intensity measuring device
200 Processor
201 Program memory
202 Modulation timing correctness deciding section
203 Modulator driver
204 Memory

What is claimed is:

1. An optical sender that modulates an optical pulse train having a predetermined period for data sending, comprising:
    a first modulator that performs intensity modulation on the optical pulse train to output a first optical pulse train, wherein the intensity modulation is performed at least between a reference intensity and a zero intensity;
    an asymmetric interferometer that inputs the first optical pulse train and outputs a second optical pulse train of double pulses, wherein each double pulse is generated by temporally separating each optical pulse of the first optical pulse train;
    a second modulator that performs send-data modulation for each pulse pair of the second optical pulse train to output a third optical pulse train;
    an optical intensity monitor that measures an optical intensity of the third optical pulse train; and
    a controller configured to:
        a) control the intensity modulation of the first modulator for generating each double pulse of the second optical pulse train having the reference intensity or the zero intensity depending on the intensity modulation according to an intensity modulation pattern;
        b) control the send-data modulation of the second modulator for generating each pulse pair of the second optical pulse train with either pulse of the pulse pair having the zero intensity depending on the send-data modulation according to a send-data modulation pattern; and
        c) decide whether or not the pulse pair is the double pulse, based on an optical intensity of the third optical pulse train when changing either of the intensity modulation pattern and the send-data modulation pattern.

2. The optical sender according to claim 1, wherein the optical intensity monitor measures an average optical intensity of the third optical pulse train.

3. The optical sender according to claim 1, wherein, in the c), the controller is configured to:
    change either of the intensity modulation pattern and the send-data modulation pattern; and
    decide whether or not the pulse pair is the double pulse, based on a comparison result between a first optical intensity of the third optical pulse train before pattern change and a second optical intensity of the third optical pulse train after pattern change.

4. The optical sender according to claim 1, wherein, assuming that the optical pulse train has the reference intensity,
the intensity modulation pattern includes a first intensity modulation pattern and a second intensity modulation pattern, wherein the first intensity modulation pattern causes the second optical pulse train to repeat a double pulse of the reference intensity, wherein the second intensity modulation pattern causes the second optical pulse train to repeat the reference intensity and the zero intensity every other double pulse by the optical pulse train repeatedly alternating between the reference intensity and the zero intensity every other pulse,
the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity,
in the c), the controller is configured to decide whether or not the pulse pair is the double pulse, by comparing a first optical intensity of the third optical pulse train with a second optical intensity of the third optical pulse train, wherein the first optical intensity is measured when the send-data modulation pattern is fixed and the intensity modulation pattern is set at the first intensity modulation pattern, wherein the second optical intensity is measured when the intensity modulation pattern is changed to the second intensity modulation patten.

5. The optical sender according to claim 1, wherein
the intensity modulation pattern causes the second optical pulse train to repeat the reference intensity and the zero intensity every other double pulse by the optical pulse train repeatedly alternating between the reference intensity and the zero intensity every other pulse,
the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity,
in the c), the controller is configured to decide whether or not the pulse pair is the double pulse, by comparing a first optical intensity of the third optical pulse train with a second optical intensity of the third optical pulse train, wherein the first optical intensity is measured when one pattern of the intensity modulation pattern and the send-data modulation pattern is fixed and the other pattern is set at a predetermined pattern, wherein the second optical intensity is measured when the other pattern is inverted.

6. The optical sender according to claim 1, wherein
the first modulator is an intensity modulator that performs intensity modulation according to a decoy state method,
the second modulator is an intensity-phase modulator that performs phase modulation on the pulse pair or intensity modulation such that any one pulse of the pulse pair has zero intensity according to the send data, and the optical intensity measuring device uses an optical detector that monitors the optical intensity of the third optical pulse train,
wherein in the c), the controller is configured to adjust modulation timing of the second modulator such that the pulse pair becomes the double pulse.

7. A method for deciding whether modulation timing correctness in an optical sender that modulates an optical pulse train having a predetermined period for data sending, the method comprising:
by a first modulator, performing intensity modulation on the optical pulse train to output a first optical pulse train, wherein the intensity modulation is performed at least between a reference intensity and a zero intensity;
by an asymmetric interferometer, inputting the first optical pulse train and outputting a second optical pulse train of double pulses, wherein each double pulse is generated by temporally separating each optical pulse of the first optical pulse train;
by a second modulator, performing send-data modulation for each pulse pair of the second optical pulse train to output a third optical pulse train;
by an optical intensity measuring device, measuring an optical intensity of the third optical pulse train; and
by a controller,
a) controlling the intensity modulation of the first modulator
for generating each double pulse of the second optical pulse train having the reference intensity or the zero intensity depending on the intensity modulation according to an intensity modulation pattern;
b) controlling the send-data modulation of the second modulator for generating each pulse pair of the second optical pulse train with either pulse of the pulse pair having the zero intensity depending on the send-data modulation according to a send-data modulation pattern; and
c) deciding whether or not the pulse pair is the double pulse, based on an optical intensity of the third optical pulse train when changing either of the intensity modulation pattern and the send-data modulation pattern.

8. The method according to claim 7, wherein the optical intensity monitor measures an average optical intensity of the third optical pulse train.

9. The method according to claim 7, wherein, the c) comprises:
changing either of the intensity modulation pattern and the send-data modulation pattern; and
deciding whether or not the pulse pair is the double pulse, based on a comparison result between a first optical intensity of the third optical pulse train before pattern change and a second optical intensity of the third optical pulse train after pattern change.

10. The method according to claim 7, wherein, assuming that the optical pulse train has the reference intensity,
the intensity modulation pattern includes a first intensity modulation pattern and a second intensity modulation pattern, wherein the first intensity modulation pattern causes the second optical pulse train to repeat a double pulse of the reference intensity, wherein the second intensity modulation pattern causes the second optical pulse train to repeat the reference intensity and the zero intensity every other double pulse by the optical pulse train repeatedly alternating between the reference intensity and the zero intensity every other pulse, the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity, the c) comprises:

deciding whether or not the pulse pair is the double pulse, by comparing a first optical intensity of the third optical pulse train with a second optical intensity of the third optical pulse train, wherein the first optical intensity is measured when the send-data modulation pattern is fixed and the intensity modulation pattern is set at the first intensity modulation pattern, wherein the second optical intensity is measured when the intensity modulation pattern is changed to the second intensity modulation patten.

11. The method according to claim 7, wherein the intensity modulation pattern causes the second optical pulse train to repeat the reference intensity and the zero intensity every other double pulse by the optical pulse train repeatedly alternating between the reference intensity and the zero intensity every other pulse, the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity, the c) comprises:

deciding whether or not the pulse pair is the double pulse, by comparing a first optical intensity of the third optical pulse train with a second optical intensity of the third optical pulse train, wherein the first optical intensity is measured when one pattern of the intensity modulation pattern and the send-data modulation pattern is fixed and the other pattern is set at a predetermined pattern, wherein the second optical intensity is measured when the other pattern is inverted.

12. A non-transitory computer readable storage medium storing a program for functioning a computer as a controller of an optical sender including: a first modulator that performs intensity modulation on the optical pulse train to output a first optical pulse train, wherein the intensity modulation is performed at least between a reference intensity and a zero intensity; an asymmetric interferometer that inputs the first optical pulse train and outputs a second optical pulse train of double pulses, wherein each double pulse is generated by temporally separating each optical pulse of the first optical pulse train; a second modulator that performs send-data modulation for each pulse pair of the second optical pulse train to output a third optical pulse train; and an optical intensity monitor that measures an optical intensity of the third optical pulse train, the program which, when executed by a processor of the optical sender, performs a method comprising:

a) generating each double pulse of the second optical pulse train having the reference intensity or the zero intensity depending on the intensity modulation according to an intensity modulation pattern;

b) generating each pulse pair of the second optical pulse train with either pulse of the pulse pair having the zero intensity depending on the send-data modulation according to a send-data modulation pattern; and c) deciding whether or not the pulse pair is the double pulse, based on an optical intensity of the third optical pulse train when changing either of the intensity modulation pattern and the send-data modulation pattern.

13. The non-transitory computer readable storage medium according to claim 12, wherein the optical intensity monitor measures an average optical intensity of the third optical pulse train.

14. The non-transitory computer readable storage medium according to claim 12, wherein the c) comprises:

changing either of the intensity modulation pattern and the send-data modulation pattern; and deciding whether or not the pulse pair is the double pulse, based on a comparison result between a first optical intensity of the third optical pulse train before pattern change and a second optical intensity of the third optical pulse train after pattern change.

15. The non-transitory computer readable storage medium according to claim 12, wherein, assuming that the optical pulse train has the reference intensity, the intensity modulation pattern includes a first intensity modulation pattern and a second intensity modulation pattern, wherein the first intensity modulation pattern causes the second optical pulse train to repeat a double pulse of the reference intensity, wherein the second intensity modulation pattern causes the second optical pulse train to repeat the reference intensity and the zero intensity every other double pulse by the optical pulse train repeatedly alternating between the reference intensity and the zero intensity every other pulse, the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity, the c) comprises:

deciding whether or not the pulse pair is the double pulse, by comparing a first optical intensity of the third optical pulse train with a second optical intensity of the third optical pulse train, wherein the first optical intensity is measured when the send-data modulation pattern is fixed and the intensity modulation pattern is set at the first intensity modulation pattern, wherein the second optical intensity is measured when the intensity modulation pattern is changed to the second intensity modulation patten.

16. The non-transitory computer readable storage medium according to claim 12, wherein the intensity modulation pattern causes the second optical pulse train to repeat the reference intensity and the zero intensity every other double pulse by the optical pulse train repeatedly alternating between the reference intensity and the zero intensity every other pulse, the send-data modulation pattern includes a first send-data modulation pattern and a second send-data modulation pattern which alternate repeatedly, wherein the first send-data modulation pattern causes one pulse of the pulse pair to have zero intensity and the other pulse to have the reference intensity, wherein the second send-data modulation pattern causes the one pulse of the pulse pair to have the reference intensity and the other pulse to have the zero intensity, the c) comprises:

deciding whether or not the pulse pair is the double pulse, by comparing a first optical intensity of the third optical pulse train with a second optical intensity of the third optical pulse train, wherein the first optical intensity is measured when one pattern of the intensity modulation pattern and the send-data modulation pattern is fixed and the other pattern is set at a predetermined pattern, wherein the second optical intensity is measured when the other pattern is inverted.

* * * * *